July 26, 1966
TAKASHI KUMAGAI  
DEVICE FOR AUTOMATIC FRONT-BACK DISCRIMINATION  
AND UNIFORM ORIENTATION OF WORK PARTS  
Filed March 22, 1965
3,262,544
FIG. 1
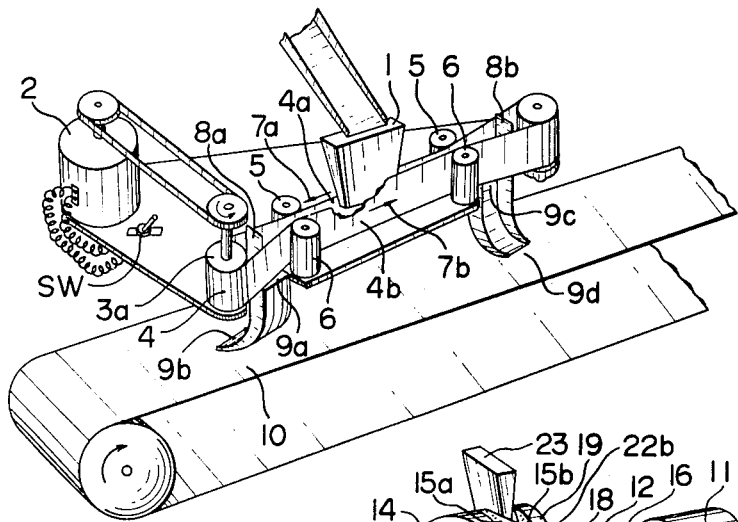
FIG. 2
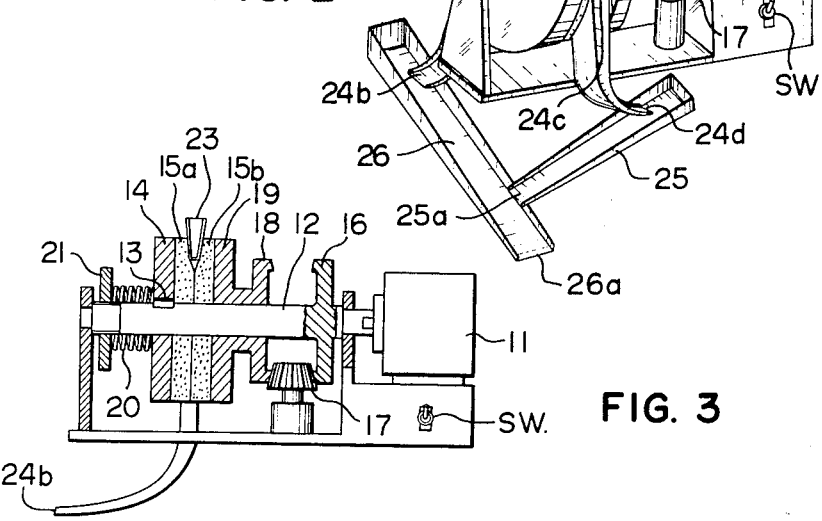
FIG. 3

United States Patent Office 3,262,544
Patented July 26, 1966

---

3,262,544
DEVICE FOR AUTOMATIC FRONT-BACK DISCRIMINATION AND UNIFORM ORIENTATION OF WORK PARTS
Takashi Kumagai, 231 Kinuta-cho, Setagaya-ku, Tokyo-to, Japan
Filed Mar. 22, 1965, Ser. No. 441,590
Claims priority, application Japan, Apr. 4, 1964, 39/18,910
3 Claims. (Cl. 198—33)

This invention relates to automatic discrimination and feeding devices for product parts, and more particularly it relates to a new device for automatic front-back discrimination and uniform orientation of work parts provided with a mechanism wherein two surfaces of one or more pliable members are caused to move in opposite directions as they rub against each other, whereby parts of relative small size and thickness placed therebetween are fed with uniform orientation.

In the timepiece manufacturing industry, the camera manufacturing industry, and many other precision industries, there frequently arises the need to discriminate between one surface and the opposite surface (front and back surfaces) of miniature parts and to feed all of these parts with their sides of the same kind facing the same direction. However, it is extremely difficult to accomplish automatic feeding with uniform orientation of miniature parts such as, for example, gear blanks for timepieces wherein the only difference between one surface and the other (front and back) is merely the presence of very slight burrs on one surface.

It is a general object of the present invention to facilitate the automatization of work processes of the above indicated nature.

More specifically, it is an object of the invention to provide a device capable of accomplishing automatic front-back discrimination of work parts and feeding of said parts with uniform orientation.

According to the present invention, briefly stated, there is provided a device of the type referred to above provided with one or more pliable members having at least two surfaces which are caused to move in opposite directions as they are maintained in mutually rubbing contact, the pliable members being made of a pliable material capable of detecting the difference between the surface states of two sides of each work part fed into a position between the two moving surfaces in accordance with the difference between the degrees to which said two sides bite into the pliable material, that is, the difference between the total effective frictional resistance of the two sides, whereby the work part so fed is discriminately carried in the direction of one of the two moving surfaces, and all of the work parts are collected and fed with uniform orientation, that is, with their sides of the same kind facing in the same direction.

The nature, principle, and details of the invention will be more clearly apparent from the following detailed description with respect to preferred embodiments of the invention, when read in conjunction with the accompanying drawing in which like parts are designated by like reference characters, and in which:

FIGURE 1 is a partial perspective view of one embodiment of the device according to the invention wherein a pliable member of belt form is used;

FIGURE 2 is a perspective view showing another embodiment of the invention wherein pliable members of disk shape are used; and FIGURE 3 is an elevational sectional view of the device shown in FIGURE 2.

Referring to FIGURE 1, in the device shown therein, the work, each having burrs on one side, are fed through a work feed hopper 1 and drop into a position between rubbing parts 4a and 4b of a pliable member 4 of belt form which is driven by a motor 2 through a drive roller 3a. The mutual lateral pressure for rubbing between the rubbing parts 4a and 4b is suitably maintained by two pairs of pressure rollers 5, 6.

When the direction of travel of the belt pliable member 4 is as indicated by arrows 7a and 7b, a piece of work dropping with its burr side facing the part 4a of the member 4 is caused to adhere to this part 4a because its burrs bite into the surface of the pliable member 4 and is carried in the direction of arrow 7a, subsequently being scraped off by an end plate 8a to drop through a work receiving opening 9a and be discharged through an exit 9b with its burr side facing upward.

Similarly, a workpiece with its burr side facing the part 4b is carried in the direction of arrow 7b, is scraped off by an end plate 8b, drops through a work receiving opening 9c, and is discharged from an exit 9d with its burr side facing upward.

Consequently, workpieces with their burr sides facing upward are always supplied onto conveyor 10. By reversing the direction of travel of the belt from member 4 or by reversing the direction of curvature of the sliding chute 9 for discharge, the burr can be caused to face downward.

In another embodiment of the invention as shown in FIGURES 2 and 3, pliable members 15a and 15b of disk shape are used. The device is provided with a horizontal shaft 12 driven by a motor 11 and driving a pressure disk 14 fixed unitarily thereto by a key 13. The pressure disk 14 supports a disk-shaped pliable member 15a bonded to one face thereof.

On one hand, a crown gear 16 fixed integrally to the shaft 12 drives, through a pinion 17, a crown gear 18 in the direction opposite to that of the gear 16 and shaft 12. The crown gear 18 is integrally formed with a pressure reaction disk 19 with which it rotates freely and coaxially about the shaft 12. A disk-shaped pliable member 15b is bonded onto the surface of the disk 19 facing the disk 14. The mutual pressure force between the two disks 14 and 19 can be varied by suitably turning an adjusting nut 21 to adjust the compressive force of a spring 20. Thus, the two pliable members 15a and 15b can be maintained in contact with a suitable pressure force therebetween as they are caused to rotate in opposite directions as indicated by arrows 22a and 22b, respectively.

Work fed through a work feed hopper 23 adheres to either pliable member 15a or pliable member 15b depending on the direction of the burrs thereon and is conveyed to either work receiving opening 24a (not visible) or to opening 24c to drop therethrough and be discharged through a first exit 24b or a first exit 24d with the burr side facing upward. An auxiliary slide chute 25 which is connected to the exit 24d discharges the work, with its burr side up, through a second exit 25a. Then the work, with the burr sides of all pieces facing in the same direction, is sent to a common slide 26 to be discharged through a final exit 26a.

The burr side direction can be reversed, of course, by reversing the rotational directions of the pliable members 15a and 15b. For this purpose, a reversible motor is used for the motor 11, and a motor reversing switch SW is provided.

The material for the pliable member of belt form or disk form is, of course, suitably selected in accordance with factors such as the material of the work, the sizes of the burrs, and the degree of differences between the shapes and dimensions of the two faces of the work. I have found that, in the case of work consisting of miniature parts, synthetic resins such as polyvinyl chloride and polyethylene or pliable materials such as rubber, in general, are excellent.

I have found further that, by suitably selecting the other conditions such as the pressure between the rubbing members and the configurations and dimensions of the slide chutes and the end plates, it is possible to detect even very slight differences in surface state in terms of differences in the degrees to which the work bites into the pliable material. Therefore, the present invention makes possible completely automatic front-back discrimination and orderly feeding of product parts.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What I claim is:

1. A device for automatic front-back discrimination and uniform orientation of work parts, comprising at least one pliable member having at least two surfaces capable of undergoing movement in mutually rubbing contact in opposite directions, means to cause said two surfaces to undergo said movement, the normal pressure force of said rubbing contact being suitably controlled, means to feed work parts into a position between said two surfaces undergoing said movement, said pliable member being made of a uniform, pliable material capable of detecting the difference between the surface states of two sides of each work part so fed in accordance with the difference between the degrees to which said two sides bite into said pliable material, whereby said work part so fed is discriminately carried in the direction of that one of said two surfaces into which the side of said work part bites to a greater degree, means to collect all work parts, means to remove said work parts from said pliable member, and means for receiving, orienting, and feeding said work parts from said pliable member onto said collecting means.

2. The device as according to claim 1, wherein the pliable member is in form of at least one, endless loop structure.

3. The device as according to claim 1, wherein said movement of said two surfaces of the pliable member is reversible.

References Cited by the Examiner

FOREIGN PATENTS 718,729   9/1965   Canada.

EVON C. BLUNK, *Primary Examiner.*

R. E. AEGERTER, *Assistant Examiner.*